United States Patent
Huang et al.

(10) Patent No.: US 11,746,023 B2
(45) Date of Patent: Sep. 5, 2023

(54) BASIC COPPER CHLORIDE PARTICULATE MATTER AND PREPARATION METHOD THEREFOR

(71) Applicant: GUANGZHOU COSMO ENVIRONMENTAL TECHNOLOGY CO., LTD., Guangdong (CN)

(72) Inventors: Zhiyuan Huang, Guangdong (CN); Yangdong Wu, Guangdong (CN); Zhiyong Zhang, Guangdong (CN); Hao Wang, Guangdong (CN); Zhengjiong Zha, Guangdong (CN); Yongcheng Wang, Guangdong (CN)

(73) Assignee: GUANGZHOU COSMO ENVIRONMENTAL TECHNOLOGY CO., LTD., Guangdong (CN)

( * ) Notice: Subject to any disclaimer, the term of this patent is extended or adjusted under 35 U.S.C. 154(b) by 461 days.

(21) Appl. No.: 16/767,586

(22) PCT Filed: Dec. 21, 2017

(86) PCT No.: PCT/CN2017/117642
§ 371 (c)(1),
(2) Date: May 27, 2020

(87) PCT Pub. No.: WO2019/119339
PCT Pub. Date: Jun. 27, 2019

(65) Prior Publication Data
US 2020/0385281 A1 Dec. 10, 2020

(30) Foreign Application Priority Data
Dec. 18, 2017 (CN) .......................... 201711367950.8

(51) Int. Cl.
*C01G 3/05* (2006.01)
*A23K 20/20* (2016.01)

(52) U.S. Cl.
CPC ................ *C01G 3/05* (2013.01); *A23K 20/30* (2016.05); *C01P 2004/61* (2013.01)

(58) Field of Classification Search
CPC .......... C01H 3/05; C01P 2004/51; G01G 3/05
See application file for complete search history.

(56) References Cited

U.S. PATENT DOCUMENTS

2008/0113063 A1    5/2008  Roper et al.

FOREIGN PATENT DOCUMENTS

| CN | 101434405 |   | 5/2009 |
| --- | --- | --- | --- |
| CN | 102730743 |   | 10/2012 |
| CN | 103351020 A | * | 10/2013 |
| CN | 103818944 |   | 5/2014 |
| CN | 105329933 A | * | 2/2016 |
| CN | 105399132 A | * | 3/2016 |
| CN | 106517301 A | * | 3/2017 |
| KR | 930004476 B1 | * | 5/1993 |

OTHER PUBLICATIONS

"International Search Report (Form PCT/ISA/210) of PCT/CN2017/117642", dated Sep. 26, 2018, with English translation thereof, pp. 1-4.

Chen, Changming, et al., "Study on the Synthesis and the Characteristic of Tribasic Copper Chloride," Feed Industry, vol. 25, May 2004, pp. 1-4.

\* cited by examiner

*Primary Examiner* — Kyle A Purdy
(74) *Attorney, Agent, or Firm* — JCIP GLOBAL INC.

(57) ABSTRACT

Disclosed are basic copper chloride particulate matter and a preparation method therefor. The basic copper chloride particulate matter is mainly composed of basic copper chloride particles, and the basic copper chloride particles, with a particle size of 60-250 μm, in the basic copper chloride particulate matter comprise 97% or more of the total mass of the basic copper chloride particulate matter.

8 Claims, 4 Drawing Sheets

BASIC COPPER CHLORIDE PARTICULATE MATTER AND PREPARATION METHOD THEREFOR

CROSS-REFERENCE TO RELATED APPLICATION

This application is a 371 of international application of PCT application serial no. PCT/CN2017/117642, filed on Dec. 21, 2017, which claims the priority benefit of China application no. 201711367950.8, filed on Dec. 18, 2017. The entirety of each of the above mentioned patent applications is hereby incorporated by reference herein and made a part of this specification.

BACKGROUND

Technical Field

The present disclosure relates to the field of mineral feed additives, and specifically, to a basic copper chloride particulate matter and a preparation method therefor.

Description of Related Art

The traditional method of synthesizing basic copper chloride is to use acidic waste etching liquid and alkaline waste etching liquid or ammonia water that are produced in a production process of a circuit board as a raw material. First, performing impurity removal, and then synthesizing basic copper chloride in a parallel feeding manner under heated conditions. Although this reaction technology is simple in process, due to the different etching precision requirements of various circuit board manufacturers, copper content of produced acidic and alkali waste etching liquids fluctuates greatly. If it is directly used to synthesize basic copper chloride, it will easily lead to problems such as wider particle size distribution, too small average particle size, large color difference, easy caking of the product, and so on. Among them, if the average particle size is too small, fugitive dust and other problems will occur during the use of basic copper chloride, especially affecting the use of basic copper chloride products.

In order to obtain basic copper chloride with a larger size, the existing patent US8802180B2 discloses a method of bonding basic copper chloride in small particles into basic copper chloride in larger particles through a starch adhesive. However, due to the introduction of the adhesive in this method, the copper content of the prepared basic copper chloride product is relatively low. According to the test of the commercial available product of this manufacturer, the copper content is only 53~54%, which is lower than 58.12% required by the Chinese standard *Feed additive—basic copper chloride* (GB/T 21696-2008).

Therefore, it is of great significance to prepare a basic copper chloride product with a copper content that meets the requirements of Chinese standards and a suitable size.

SUMMARY

An objective of the present disclosure is to overcome the shortcomings of the above-mentioned prior art, and to provide a basic copper chloride particulate matter. Size of basic copper chloride particulate product constituting the basic copper chloride particulate matter is relatively large, which solves the problem of fugitive dust during use.

Another objective of the present disclosure is to provide a preparation method for the basic copper chloride particulate matter.

The above objectives of the present disclosure are achieved by the following technical solutions.

A basic copper chloride particulate matter mainly consists of basic copper chloride particles. The basic copper chloride particles having a particle size of 60 μm to 250 μm in the basic copper chloride particulate matter account for 97% or more of a total mass of the basic copper chloride particulate matter.

The distribution of the basic copper chloride particles can be tested by sieving and weighing, and the specific method is as follows: weighing a certain amount of a basic copper chloride product, passing through a test sieve with a pore size of 60 μm and a test sieve with a pore size of 250 μm in order, calculating the mass $W1$ of the basic copper chloride product passing through the 60 μm test sieve, and the mass $W2$ of the basic copper chloride product entrapped at the 250 μm test sieve, then using the following formula:

mass content of particles with a particle size of 60 μm to 250 μm in the basic copper chloride particulate matter=(total mass $W-W1-W2$)/total mass $W\times 100\%$.

In an existing method, the particle size distribution of pure basic copper chloride is generally less than 50 μm. It can be achieved by programming adhesive bonding in the range of 50 μm to 300 μm, but the copper content is difficult to meet the standard. The basic copper chloride particulate matter of the present disclosure has both a large size and a high copper content, which can meet higher standards of use. In the basic copper chloride particulate matter, the mass content of copper is greater than 58.12%.

The basic copper chloride particles of the present disclosure are directly obtained through the preparation process of basic copper chloride, and thus the basic copper chloride particles are free of adhesives.

Using the preparation method of the present disclosure, it is also easier to obtain a basic copper chloride particulate matter that is not easy to agglomerate. In the basic copper chloride particulate matter obtained by the method of the present disclosure, a crystal form of the basic copper chloride particles is mainly atacamite crystal form and/or paratacamite crystal form, and is preferably a mixture of the atacamite crystal form and the paratacamite crystal form. The commercially available basic copper chloride is mostly botallackite crystal form or amorphous, and this type of basic copper chloride is far less stable than the atacamite crystal form and/or paratacamite crystal form, and is prone to agglomeration.

The method of the present disclosure can be further optimized to obtain basic copper chloride particles whose crystal form is completely atacamite crystal form and/or paratacamite crystal form.

The basic copper chloride particulate matter of the present disclosure, when placed in a constant temperature and humidity box with a relative humidity of 75% and a temperature of 60° C. for 15 days, is still not agglomerated, indicating that the product has a longer shelf life under high temperature and high humidity conditions.

A preparation method for the basic copper chloride particulate matter includes the following steps:

preparing an ammonium chloride solution with an ammonia nitrogen concentration of 40 g/L to 60 g/L, heating to 70° C. to 90° C., then adding a copper chloride precursor solution and an ammonium chloride precursor solution into the ammonium chloride solution simultaneously in a parallel feeding manner at a flow ratio of 1:0.5 to 1:1.5, maintaining a reaction pH value between 4.2 and 4.8, stopping feeding until a basic copper chloride solid appears at the bottom of a reaction vessel, performing a heat preservation reaction for 1 to 4 hours; then adding a copper chloride raw material solution and an alkaline copper-containing solution simultaneously in a parallel feeding manner, maintaining the reaction pH value between 4.2 to 4.8, reacting for 2 to 4 hours, discharging, washing and drying to obtain the basic copper chloride particulate matter;

the copper chloride precursor solution is a copper chloride acidic precursor solution with a copper content of 40 g/L to 60 g/L and a pH of 1.0 to 2.0;

the ammonium chloride precursor solution is an ammonium chloride alkaline precursor solution with an ammonium chloride content of 170 g/L to 190 g/L and a pH of 8.0 to 9.5;

the copper chloride raw material solution is a copper chloride copper-containing solution with a copper content of 40 g/L to 120 g/L and a pH value of 1.0 to 2.0 a; and the alkaline copper-containing solution is an alkaline copper-containing solution with a copper content of 30 g/L to 100 g/L and a pH value of 8.0 to 9.5.

In the present disclosure, a basic copper chloride solid is prepared at a lower concentration as a precursor, and is subjected to a heat preservation reaction to promote the formation of crystal nuclei, and then grows on the crystal nuclei to form the basic copper chloride particulate matter in larger particles.

In the present disclosure, the copper chloride raw material solution and the alkaline copper-containing solution can be prepared not only with relatively pure raw materials, but also with treated acidic and alkaline waste etching liquids used as corresponding raw materials.

The copper content of the acidic and alkaline waste etching liquids from different manufacturers is different. If the acidic and alkaline waste etching liquids are directly used to synthesize basic copper chloride, it will easily cause agglomeration of the basic copper chloride when the copper content is too high, and when the copper content is too low, the obtained basic copper chloride particles will be relatively fine which will cause a large amount of dust after drying. Moreover, the copper concentration of the raw materials is inconsistent, and it is easy to obtain basic copper chloride with different crystal forms, resulting in large differences in product color.

When the acidic waste etching liquid and the alkaline waste etching liquid are used as the raw materials of the present disclosure, the following treatments are preferred.

The copper chloride raw material solution is prepared according to the following method:

preforming impurity removal treatment to the acidic waste etching liquid, and adjusting the copper content and pH value to obtain the copper chloride raw material solution.

The alkaline copper-containing solution is prepared according to the following method: preforming impurity removal treatment to the alkali waste etching liquid, and adjusting the copper content and pH value to obtain the alkaline copper-containing solution.

By adjusting the copper concentration in the acidic and alkaline waste etching liquids, the present disclosure can not only ensure that a more consistent copper concentration could be obtained after processing different manufacturers of raw material etching liquids, ensuring the stability of the raw materials, but also reduce the copper concentration appropriately, which indirectly reduces the reaction rate, so that the rate of formation of basic copper chloride crystal nuclei and the rate of crystal growth are maintained at a balance point. Therefore, even if an industrial waste liquid such as waste etching liquid is used as a raw material, the basic copper chloride with a larger particle size can still be prepared. The particles of the obtained product are relatively uniform. The proportion of basic copper chloride with a particle size of 60 μm to 250 μm accounts for more than 97%. The product has a small amount of dust and a relatively consistent color.

Preferably, the steps of performing impurity removal treatment to the acidic waste etching liquid is as follows:

S1, adding water into the acidic waste etching liquid, adjusting the copper content to 40 g/L to 120 g/L; and S2, adding an oxidant, adjusting the pH value to 1.0 to 2.0, and adjusting the copper content to 40 g/L to 120 g/L, and obtaining the copper chloride raw material solution after filtration.

The oxidant is selected from one or more of hydrogen peroxide, sodium chlorate, potassium chlorate, sodium perchlorate, and potassium perchlorate, and it can be in the form of an aqueous solution or a solid.

Preferably, the step of performing impurity removal treatment to the alkaline waste etching liquid is as follows:

adding an impurity removing agent, ammonium water or water into the alkaline waste etching liquid, adjusting the copper content to 30 g/L to 100 g/L and the pH to 8.0 to 9.5 to obtain the alkaline copper-containing solution.

The impurity removing agent is selected from one or more of ferric chloride, polymeric ferric chloride, and polymeric aluminum chloride, and it can be in the form of an aqueous solution or a solid.

On the premise that the present disclosure obtains a basic copper chloride precursor, the feeding between the copper chloride raw material solution and the alkaline copper-containing solution is required to meet the general production of basic copper chloride. Preferably, when the copper chloride raw material solution and the alkaline copper-containing solution are fed in parallel, a flow ratio is 1:0.5 to 1:1.5.

A feed additive contains the basic copper chloride particulate matter.

Compared with the prior art, the present disclosure has the following beneficial effects.

In the basic copper chloride particulate matter of the present disclosure, a content of the basic copper chloride particles having a particle size of 60 μm to 250 μm is 97%, which solves the fugitive dust problem well. The basic copper chloride particulate matter prepared by the preparation method of the present disclosure is more stable in crystal structure and less prone to agglomeration. In the preparation method provided by the present disclosure, by adjusting the copper concentration in the acidic and alkaline waste etching liquids, the stability of the raw materials is ensured, and the appropriate reduction of the copper concentration indirectly reduces the reaction rate, so that the rate of formation of basic copper chloride nuclei and the rate of crystal growth are maintained at a balance point. Therefore, the basic copper chloride particulate matter with a uniform and appropriate size can be directly prepared, and has a relatively consistent color, and the product has high purity and high copper content.

DESCRIPTION OF THE EMBODIMENTS

Figure 1:
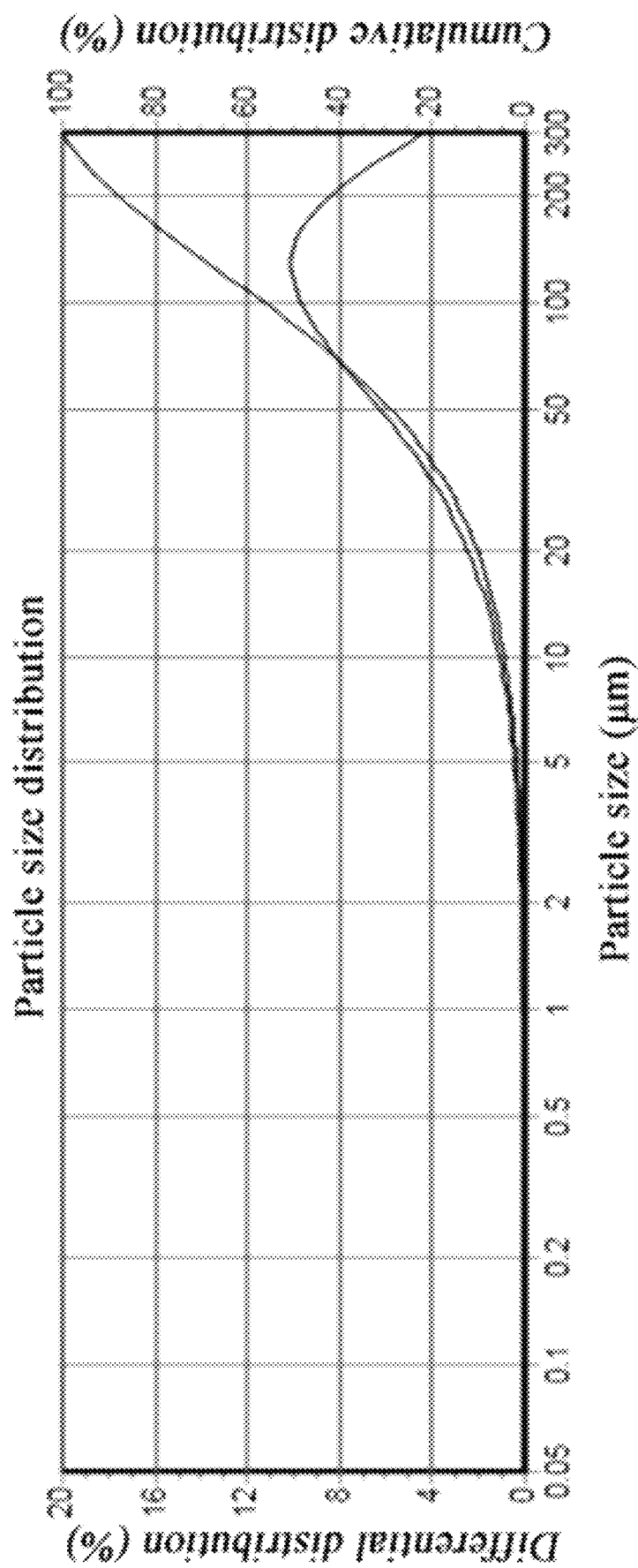
FIG. 1 shows a particle size distribution diagram of a basic copper chloride product of the present disclosure.

The present disclosure is further described below in combination with specific implementations, but the present disclosure is not limited by the embodiments in any ways. Unless otherwise, raw materials and reagents used in the embodiments of the present disclosure are conventional raw materials and reagents which are commercially available.

TABLE 1

Acidic waste etching liquid provided by a circuit board manufacturer (wt %)

| Cu | As | Cd | Hg | Pb | Cr | pH |
|---|---|---|---|---|---|---|
| 8~12 | 0.0012 | 0.0003 | <0.0001 | 0.0002 | Negative | <0.5 |

TABLE 2

Alkaline waste etching liquid provided by a circuit board manufacturer (wt %)

| Cu | As | Cd | Hg | Pb | Cr | pH |
|---|---|---|---|---|---|---|
| 7~11 | 0.001 | 0.00005 | <0.0001 | 0.0001 | Negative | 8~10 |

EMBODIMENTS

An ammonium chloride solution with an ammonia concentration of A g/L was prepared and heated to B° C., then a copper chloride precursor solution and an ammonium chloride precursor solution were added in to the ammonium chloride solution simultaneously in a parallel feeding manner at a flow ratio of C, a reaction pH value was maintained between D, the feeding was stopped until a basic copper chloride solid appears at in the reaction system, and heat preservation reaction was performed for E hours. Then a copper chloride raw material solution and an alkaline copper-containing solution were added simultaneously in a parallel feeding manner, the reaction pH value was maintained between F, reaction was performed for G hours, discharging, washing and drying were performed to obtained the basic copper chloride particulate matter.

The copper chloride precursor solution was a copper chloride acidic precursor solution with a copper content of H g/L and a pH of I.

The ammonium chloride precursor solution was an ammonium chloride alkaline precursor solution with an ammonium chloride content of J g/L and a pH of K.

The copper chloride raw material solution was a copper chloride copper-containing solution with a copper content of L g/L and a pH value of M.

The alkaline copper-containing solution was an alkaline copper-containing solution with a copper content of N g/L and a pH value of O.

A flow ratio of the copper chloride raw material solution to the alkaline copper-containing solution was P.

In the present disclosure, with the addition of raw materials, small suspended basic copper chloride particles gradually appeared in the reaction system, and as the reaction proceeded, the small basic copper chloride particles would gradually grow larger and settled, which just settled to the bottom of the reaction vessel. By observing the bottom of the reaction vessel (usually a reaction kettle), it was judged that basic copper chloride precursor was generated when basic copper chloride solid was present at the bottom of the reaction vessel.

In the Embodiments 1 to 9, the copper chloride precursor solution was formulated with hydrochloric acid and copper chloride.

In the Embodiments 1 to 9, the ammonium chloride precursor solution was formulated with ammonium chloride.

In the Embodiments 1 to 9, the copper chloride raw material solution was prepared by removing impurities with an acidic waste etching liquid.

In the Embodiments 1 to 9, the alkaline copper-containing solution was prepared by removing impurities with an alkaline waste etching liquid.

The specific method of removing impurities in the acidic waste etching liquid was as follows: the acidic waste etching liquid was added with water, the copper content was adjusted to 40 g/L to 120 g/L; hydrogen peroxide was added, the pH value was adjusted to 1.0 to 2.0, and the copper content was adjusted to 40 g/L to 120 g/L, and the copper chloride raw material solution was obtained after filtration.

The specific method of removing impurities in the alkaline waste etching liquid was as follows: the alkaline waste etching liquid was added with ferric chloride, ammonium water or water, the copper content was adjusted to 30 g/L to 100 g/L, and the pH was adjusted to 8.0 to 9.5 to obtain the alkaline copper-containing solution.

Specific parameters of each embodiment are shown in Table 3.

TABLE 3

| Technological parameter | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| A | 40 | 40 | 40 | 40 | 60 | 40 | 40 | 40 | 60 |
| B | 70 | 70 | 70 | 70 | 70 | 90 | 70 | 70 | 90 |
| C | 1:0.5 | 1:0.5 | 1:0.5 | 1:1.5 | 1:0.5 | 1:0.5 | 1:0.5 | 1:0.5 | 1:1.5 |
| D | 4.2 | 4.2 | 4.8 | 4.2 | 4.2 | 4.2 | 4.2 | 4.2 | 4.8 |
| E | 1 | 1 | 1 | 1 | 1 | 1 | 1 | 4 | 2 |
| F | 4.2 | 4.2 | 4.2 | 4.2 | 4.2 | 4.2 | 4.2 | 4.2 | 4.2 |
| G | 2 | 2 | 2 | 2 | 2 | 2 | 2 | 2 | 4 |
| H | 40 | 60 | 40 | 40 | 40 | 40 | 50 | 40 | 60 |
| I | 1 | 2 | 1 | 1 | 1 | 1 | 1.5 | 1 | 2 |
| J | 170 | 190 | 170 | 170 | 170 | 170 | 180 | 170 | 190 |

TABLE 3-continued

| Technological parameter | Embodiment | | | | | | | | |
|---|---|---|---|---|---|---|---|---|---|
| | Embodiment 1 | Embodiment 2 | Embodiment 3 | Embodiment 4 | Embodiment 5 | Embodiment 6 | Embodiment 7 | Embodiment 8 | Embodiment 9 |
| K | 8 | 9.5 | 8 | 8 | 8 | 8 | 8 | 8 | 9.5 |
| L | 40 | 40 | 40 | 40 | 40 | 40 | 80 | 40 | 120 |
| M | 1 | 1 | 1 | 1 | 1 | 1 | 1 | 1 | 2 |
| N | 30 | 30 | 30 | 30 | 30 | 30 | 30 | 30 | 100 |
| O | 8 | 8 | 8 | 8 | 8 | 8 | 8 | 8 | 9.5 |
| P | 1:0.5 | 1:0.5 | 1:0.5 | 1:0.5 | 1:0.5 | 1:0.5 | 1:0.5 | 1:0.5 | 1:1.5 |

Comparative Example 1

It was basically the same as Embodiment 1, except that the copper content H in the copper chloride precursor solution was 30 g/L.

Comparative Example 2

It was basically the same as Embodiment 1, except that the copper content H in the copper chloride precursor solution was 70 g/L.

Comparative Example 3

It was basically the same as Embodiment 1, except that the pH value I of the copper chloride precursor solution was 0.5.

Comparative Example 4

It was basically the same as Embodiment 1, except that pH value I of the copper chloride precursor solution was 2.5.

Comparative Example 5

It was basically the same as Embodiment 1, except that the ammonium chloride content J in the ammonium chloride precursor solution was 150 g/L.

Comparative Example 6

It was basically the same as Embodiment 1, except that the ammonium chloride content J in the ammonium chloride precursor solution was 200 g/L.

Comparative Example 7

It was basically the same as Embodiment 1, except that the ammonium chloride precursor solution pH value K was 10.

Comparative Example 8

It was basically the same as Embodiment 1, except that the ammonia concentration A of the ammonium chloride solution was 30 g/L.

Comparative Example 9

It was basically the same as Embodiment 1, except that the ammonia concentration A of the ammonium chloride solution was 70 g/L.

Comparative Example 10

It was basically the same as Embodiment 1, except that before the precursor was put in, the temperature B of the system was 60° C.

Comparative Example 11

It was basically the same as Embodiment 1, except that before the precursor was put in, the temperature B of the system was 100° C.

Comparative Example 12

It was basically the same as Embodiment 1, except that after the precursor was put in, the pH value D of the system was maintained at 4.

Comparative Example 13

It was basically the same as Embodiment 1, except that after the precursor was put in, the pH value D of the system was maintained at 5.

Comparative Example 14

The following method was used to prepare basic copper chloride (refer to patent CN101391800 B).

The specific method was as follows: the above-mentioned alkaline copper chloride waste etching liquid and acidic copper chloride waste etching liquid were pre-treated respectively, i.e., hydrogen peroxide, magnesium chloride, and polyiron were successively added to oxidize cuprous ions to divalent copper and precipitate arsenate and arsenite ions.

The pre-treated acidic and alkaline copper chloride waste etching liquids were pumped to a reaction kettle with a feeding pump for neutralization and precipitation, and the respective flow rates were controlled with a pH electrode to control the pH between 4.9 and 5.3. After the reaction was completed, basic copper chloride precipitate was obtained, washed with suction filtration, and centrifuged to obtain basic copper chloride.

Evaluation of Result

Samples of each of the Embodiments and Comparative Examples were uniformly selected and passed through a test sieve with a pore diameter of 60 μm and a test sieve with a pore diameter of 250 μm is passed in order. The mass W1 of the basic copper chloride product passed through the 60 μm test sieve and the mass W2 of the basic copper chloride product entrapped at the 250 μm test sieve were calculated. Then the following formula was used:

mass content of particles with a particle size of 60 μm to 250 μm in the basic copper chloride particulate matter=(total mass $W-W1-W2$)/total mass $W \times 100\%$.

The results are shown in Table 4.

TABLE 4

| | Total mass of sample (W/g) | Mass passing through 60 μm (W1/g) | Mass entrapped at 250 μm (W2/g) | 60 to 250 μm particles account for mass content of sample (%) | Copper content in particulate matter (%) |
| --- | --- | --- | --- | --- | --- |
| Embodiment 1 | 100 | 1.2 | 0.8 | 98 | 58.8 |
| Embodiment 2 | 100 | 1.4 | 0.5 | 98.1 | 59.2 |
| Embodiment 3 | 100 | 0.9 | 1.2 | 97.9 | 59.1 |
| Embodiment 4 | 100 | 1.5 | 0.3 | 98.2 | 58.7 |
| Embodiment 5 | 100 | 0.9 | 1.1 | 98 | 59.0 |
| Embodiment 6 | 100 | 1.8 | 0.8 | 97.4 | 59.1 |
| Embodiment 7 | 100 | 1.3 | 1.0 | 97.7 | 58.8 |
| Embodiment 8 | 100 | 1.1 | 1.1 | 97.8 | 58.8 |
| Embodiment 9 | 100 | 0.9 | 1.2 | 97.9 | 59.1 |
| Comparative Example 1 | 100 | 23.8 | 1.5 | 74.7 | 58.34 |
| Comparative Example 2 | 100 | 24.7 | 1.3 | 74.0 | 58.30 |
| Comparative Example 3 | 100 | 25.1 | 1.1 | 73.8 | 58.27 |
| Comparative Example 4 | 100 | 24.2 | 2.0 | 73.8 | 58.33 |
| Comparative Example 5 | 100 | 24.3 | 1.9 | 73.8 | 58.28 |
| Comparative Example 6 | 100 | 25.2 | 1.3 | 73.5 | 58.33 |
| Comparative Example 7 | 100 | 24.9 | 1.2 | 73.9 | 58.39 |
| Comparative Example 8 | 100 | 24.7 | 1.7 | 73.4 | 58.30 |
| Comparative Example 9 | 100 | 25.1 | 1.8 | 73.1 | 58.35 |
| Comparative Example 10 | 100 | 25.3 | 1.9 | 72.8 | 58.27 |
| Comparative Example 11 | 100 | 24.9 | 1.8 | 73.3 | 58.32 |
| Comparative Example 12 | 100 | 25.4 | 1.6 | 73.0 | 58.39 |
| Comparative Example 13 | 100 | 25.0 | 1.4 | 73.6 | 58.36 |
| Comparative Example 14 | 100 | 99.8 | 0.1 | 0.1 | 58.61 |

Figure 2:
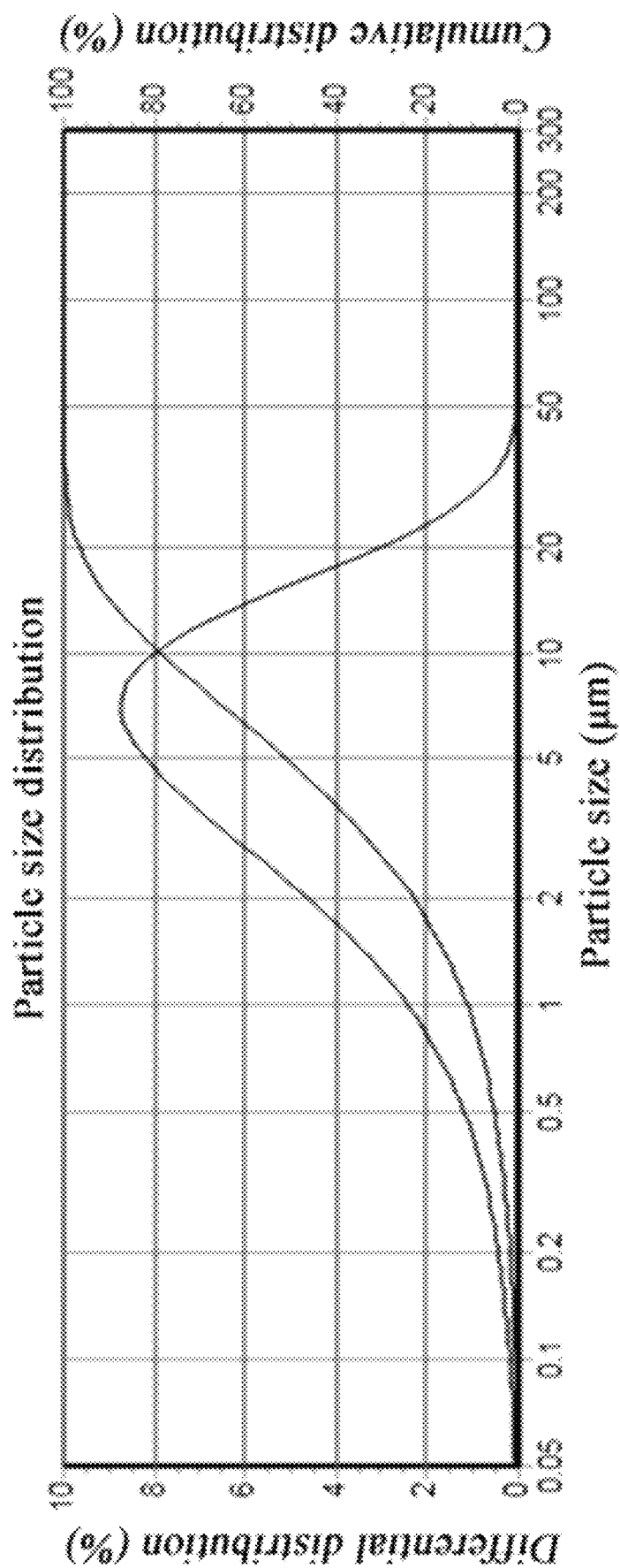
FIG. 2 shows a particle size distribution diagram of a commercially available basic copper chloride product.
Figure 4:
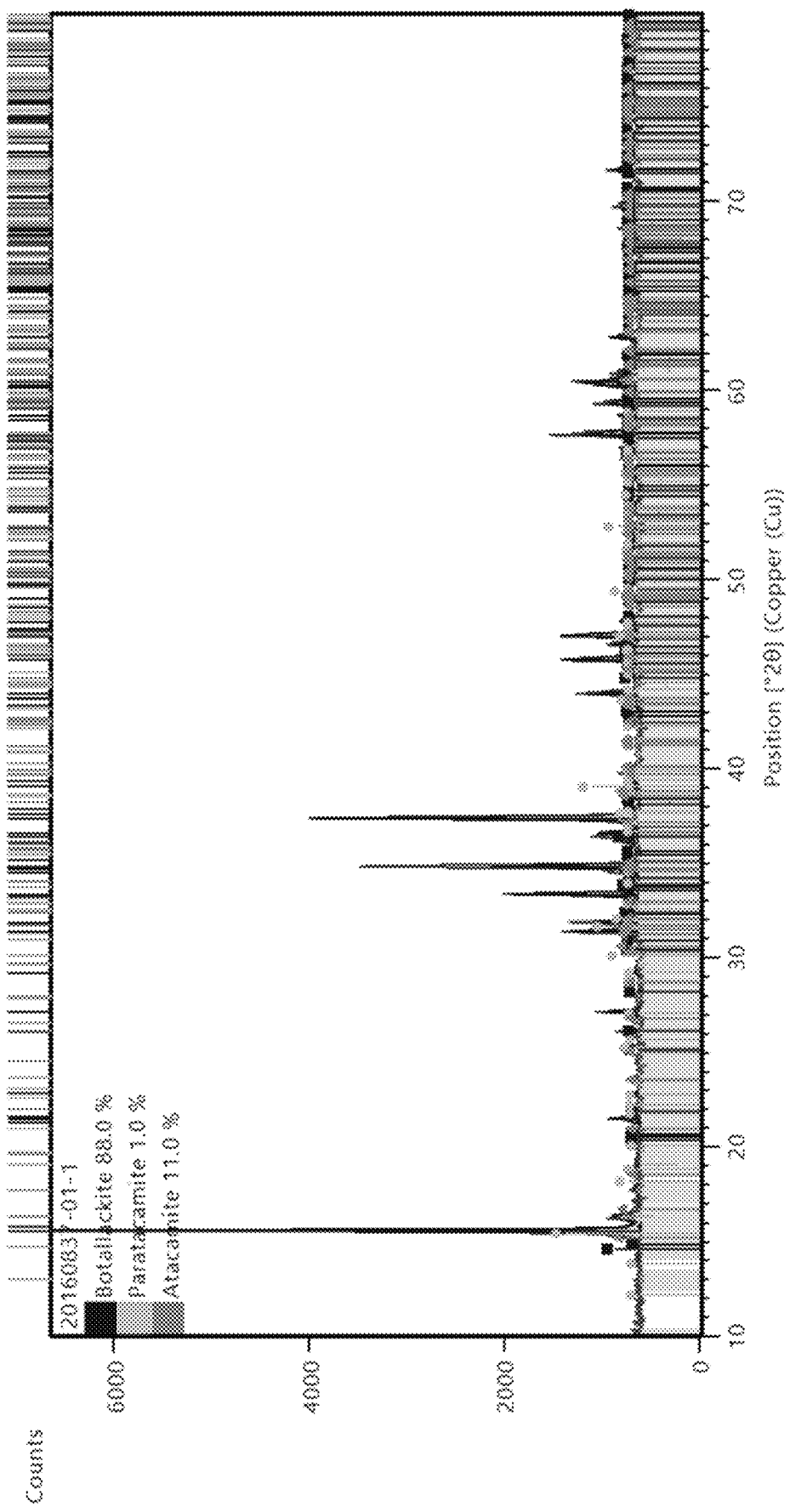
FIG. 4 shows a crystal structure distribution diagram of the commercially available basic copper chloride product.

From the above data of Embodiments and Comparative Examples, it can be seen that factors, such as the ammonia concentration of ammonium chloride solution, the pH value of the system, the ammonium chloride content in the ammonium chloride precursor solution, the pH value of the ammonium chloride precursor solution, the copper content of the copper chloride precursor solution, the pH value of the copper chloride precursor solution, all affect the formation of the basic copper chloride precursor and determine whether the basic copper chloride particulate matter in larger particles can be obtained. If the method of generating precursor first and then preparing particles according to the present disclosure is not adopted, it is also impossible to prepare the basic copper chloride particulate matter with the size of the present disclosure (see FIG. 2 and FIG. 4).

Samples of the basic copper chloride particulate matters of some of the Embodiments and commercially available basic copper chloride particulate matters were taken to perform agglomeration performance testing: 10 g of the sample was placed in a constant temperature and humidity box at a relative humidity of 75% and a temperature of 60° C. for 15 days, and the results were recorded as shown in Table 5.

TABLE 5

| | Color changed or not | Agglomeration or not |
| --- | --- | --- |
| Embodiment 1 | No color changed | No agglomeration |
| Embodiment 3 | No color changed | No agglomeration |
| Embodiment 5 | No color changed | No agglomeration |
| Embodiment 6 | No color changed | No agglomeration |
| Embodiment 9 | No color changed | No agglomeration |
| Comparative Example 14 | Color changed | Agglomeration |

Figure 3:
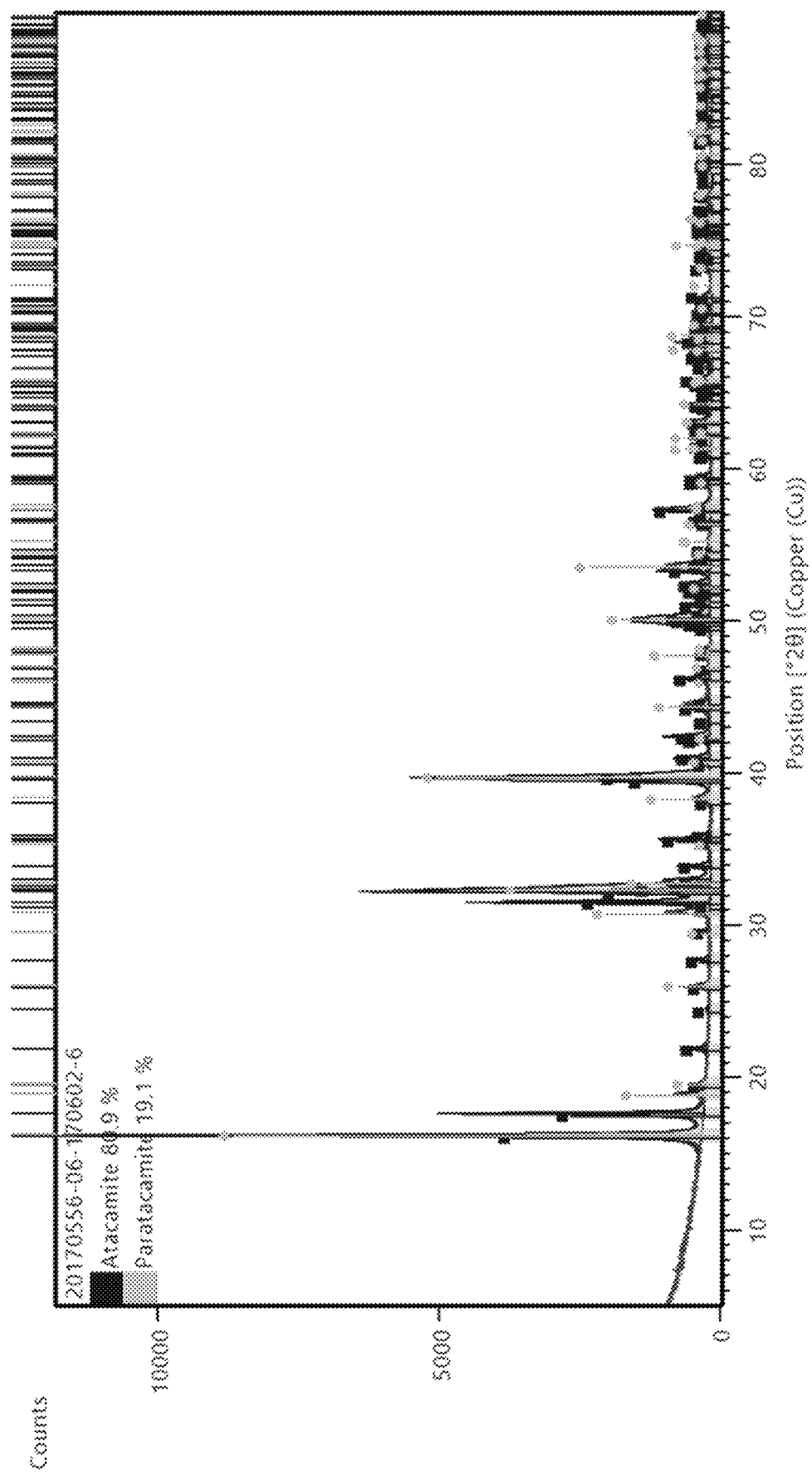
FIG. 3 shows a crystal structure distribution diagram of the basic copper chloride product of the present disclosure.

The samples of Embodiments 1, 3, 5, 6 and 9 and the samples not prepared by the method of the present disclosure were analyzed for crystal forms. The results between the embodiments are similar, and the crystal form is mainly a mixture of the atacamite crystal form and the paratacamite crystal form. The results of Embodiment 1 are shown in FIG. 3. It can be known from the analysis of crystal form of the sample of Comparative Example 14 that it contains a large amount of botallackite crystal form, which is unstable and prone to agglomeration.

What is claimed is:
1. A preparation method for a basic copper chloride particulate matter, wherein the method comprises the following steps:
preparing an ammonium chloride solution with an ammonia nitrogen concentration of 40 g/L to 60 g/L, heating to 70° C. to 90° C., then adding a copper chloride precursor solution and an ammonium chloride precur- sor solution into the ammonium chloride solution simultaneously in a parallel feeding manner at a flow ratio of 1:0.5 to 1:1.5, maintaining a reaction pH value between 4.2 and 4.8, stopping feeding until a basic copper chloride solid appears at the bottom of a reaction vessel, performing a heat preservation reaction for 1 to 4 hours; then adding a copper chloride raw material solution and an alkaline copper-containing solution simultaneously to the reaction vessel in a parallel feeding manner, maintaining the reaction pH value between 4.2 and 4.8, reacting for 2 to 4 hours, discharging, washing and drying to obtain the basic copper chloride particulate matter;

the copper chloride precursor solution is a copper chloride acidic precursor solution with a copper content of 40 g/L to 60 g/L and a pH of 1.0 to 2.0;

the ammonium chloride precursor solution is an ammonium chloride alkaline precursor solution with an ammonium chloride content of 170 g/L to 190 g/L and a pH of 8.0 to 9.5;

the copper chloride raw material solution is a copper chloride copper-containing solution with a copper content of 40 g/L to 120 g/L and a pH value of 1.0 to 2.0; and the alkaline copper-containing solution is an alkaline copper-containing solution with a copper content of 30 g/L to 100 g/L and a pH value of 8.0 to 9.5, wherein the basic copper chloride particulate matter mainly consists of basic copper chloride particles, the basic copper chloride particles having a particle size of 60 μm to 250 μm in the basic copper chloride particulate matter account for 97% or more of a total mass of the basic copper chloride particulate matter.

2. The preparation method according to claim 1, wherein the copper chloride raw material solution is prepared according to the following method:

preforming impurity removal treatment to an acidic waste etching liquid, and adjusting the copper content and pH value to obtain the copper chloride raw material solution.

3. The preparation method according to claim 1, wherein the alkaline copper-containing solution is prepared according to the following method:

preforming impurity removal treatment to an alkali waste etching liquid, and adjusting the copper content and pH value to obtain the alkaline copper-containing solution.

4. The preparation method according to claim 1, wherein when the copper chloride raw material solution and the alkaline copper-containing solution are fed to the reaction vessel in parallel, a flow ratio is 1:0.5 to 1:1.5.

5. A preparation method for a basic copper chloride particulate matter, wherein the method comprises the following steps:

preparing an ammonium chloride solution with an ammonia nitrogen concentration of 40 g/L to 60 g/L, heating to 70° C. to 90° C., then adding a copper chloride precursor solution and an ammonium chloride precursor solution into the ammonium chloride solution simultaneously in a parallel feeding manner at a flow ratio of 1:0.5 to 1:1.5, maintaining a reaction pH value between 4.2 and 4.8, stopping feeding until a basic copper chloride solid appears at the bottom of a reaction vessel, performing a heat preservation reaction for 1 to 4 hours; then adding a copper chloride raw material solution and an alkaline copper-containing solution simultaneously to the reaction vessel in a parallel feeding manner, maintaining the reaction pH value between 4.2 and 4.8, reacting for 2 to 4 hours, discharging, washing and drying to obtain the basic copper chloride particulate matter;

the copper chloride precursor solution is a copper chloride acidic precursor solution with a copper content of 40 g/L to 60 g/L and a pH of 1.0 to 2.0;

the ammonium chloride precursor solution is an ammonium chloride alkaline precursor solution with an ammonium chloride content of 170 g/L to 190 g/L and a pH of 8.0 to 9.5;

the copper chloride raw material solution is a copper chloride copper-containing solution with a copper content of 40 g/L to 120 g/L and a pH value of 1.0 to 2.0; and the alkaline copper-containing solution is an alkaline copper-containing solution with a copper content of 30 g/L to 100 g/L and a pH value of 8.0 to 9.5, wherein the basic copper chloride particulate matter mainly consists of basic copper chloride particles, the basic copper chloride particles having a particle size of 60 μm to 250 μm in the basic copper chloride particulate matter account for 97% or more of a total mass of the basic copper chloride particulate matter, wherein the basic copper chloride particulate matter is free of adhesives.

6. The preparation method according to claim 5, wherein the copper chloride raw material solution is prepared according to the following method:

preforming impurity removal treatment to an acidic waste etching liquid, and adjusting the copper content and pH value to obtain the copper chloride raw material solution.

7. The preparation method according to claim 5, wherein the alkaline copper-containing solution is prepared according to the following method:

preforming impurity removal treatment to an alkali waste etching liquid, and adjusting the copper content and pH value to obtain the alkaline copper-containing solution.

8. The preparation method according to claim 5, wherein when the copper chloride raw material solution and the alkaline copper-containing solution are fed to the reaction vessel in parallel, a flow ratio is 1:0.5 to 1:1.5.

* * * * *